(12) United States Patent
Mertins et al.

(10) Patent No.: US 8,240,320 B2
(45) Date of Patent: Aug. 14, 2012

(54) WASHING APPARATUS AND WASHING METHOD FOR SOLAR PANELS

(75) Inventors: Max Mertins, Freiburg (DE); Martin Selig, Karlsruhe (DE)

(73) Assignee: Novatec Solar GmbH, Karlsruhe (DE)

( * ) Notice: Subject to any disclaimer, the term of this patent is extended or adjusted under 35 U.S.C. 154(b) by 529 days.

(21) Appl. No.: 12/312,529

(22) PCT Filed: Nov. 15, 2007

(86) PCT No.: PCT/DE2007/002071
§ 371 (c)(1),
(2), (4) Date: Jul. 24, 2009

(87) PCT Pub. No.: WO2008/058528
PCT Pub. Date: May 22, 2008

(65) Prior Publication Data
US 2010/0000570 A1 Jan. 7, 2010

(30) Foreign Application Priority Data
Nov. 15, 2006 (DE) .......................... 10 2006 053 704

(51) Int. Cl.
*B08B 1/04* (2006.01)
*B08B 13/00* (2006.01)
*B08B 3/02* (2006.01)

(52) U.S. Cl. ......... 134/172; 134/34; 134/37; 134/104.2; 134/6; 134/198; 15/77

(58) Field of Classification Search ............... 134/6, 172, 134/198; 15/103, 250.01, 250.24
See application file for complete search history.

(56) References Cited

U.S. PATENT DOCUMENTS

| 3,158,885 A | * | 12/1964 | Werner et al. ..................... 15/51 |
| 3,816,868 A | * | 6/1974 | Dotsko .............................. 15/4 |
| 3,934,573 A | | 1/1976 | Dandini |
| 4,275,711 A | | 6/1981 | Dumbeck |
| 6,456,590 B1 | * | 9/2002 | Ren et al. ....................... 370/229 |
| 2003/0066158 A1 | | 4/2003 | Porter et al. |

FOREIGN PATENT DOCUMENTS

| DE | 27 38 666 | 3/1979 |
| DE | 29 50 078 | 6/1981 |
| DE | 10 2004 036 094 | 2/2006 |
| DE | 20 2006 003 697 | 5/2006 |
| JP | 62-013084 | 1/1987 |
| JP | 03-192775 | 8/1991 |
| JP | 11-350684 | 12/1999 |
| JP | 2004-186632 | 7/2004 |
| WO | WO 2004/091816 | 10/2004 |

OTHER PUBLICATIONS

International Search Report.

* cited by examiner

*Primary Examiner* — Michael Barr
*Assistant Examiner* — Caitlin N Dunlap
(74) *Attorney, Agent, or Firm* — Collard & Roe, P.C.

(57) ABSTRACT

Disclosed is a method for cleaning solar panels by means of a washing apparatus (1) which can be displaced on the solar panel (2) and applies rinsing water to the surface of the solar panel (2) and washes the surface with the help of washing nozzles and/or brushes. The washing apparatus (1) embraces the solar panel (2) in the edge region in such a way that the washing apparatus (1) is guided in a longitudinally movable way directly on the solar panel (2).

16 Claims, 3 Drawing Sheets

WASHING APPARATUS AND WASHING METHOD FOR SOLAR PANELS

CROSS REFERENCE TO RELATED APPLICATIONS

Figure 1:
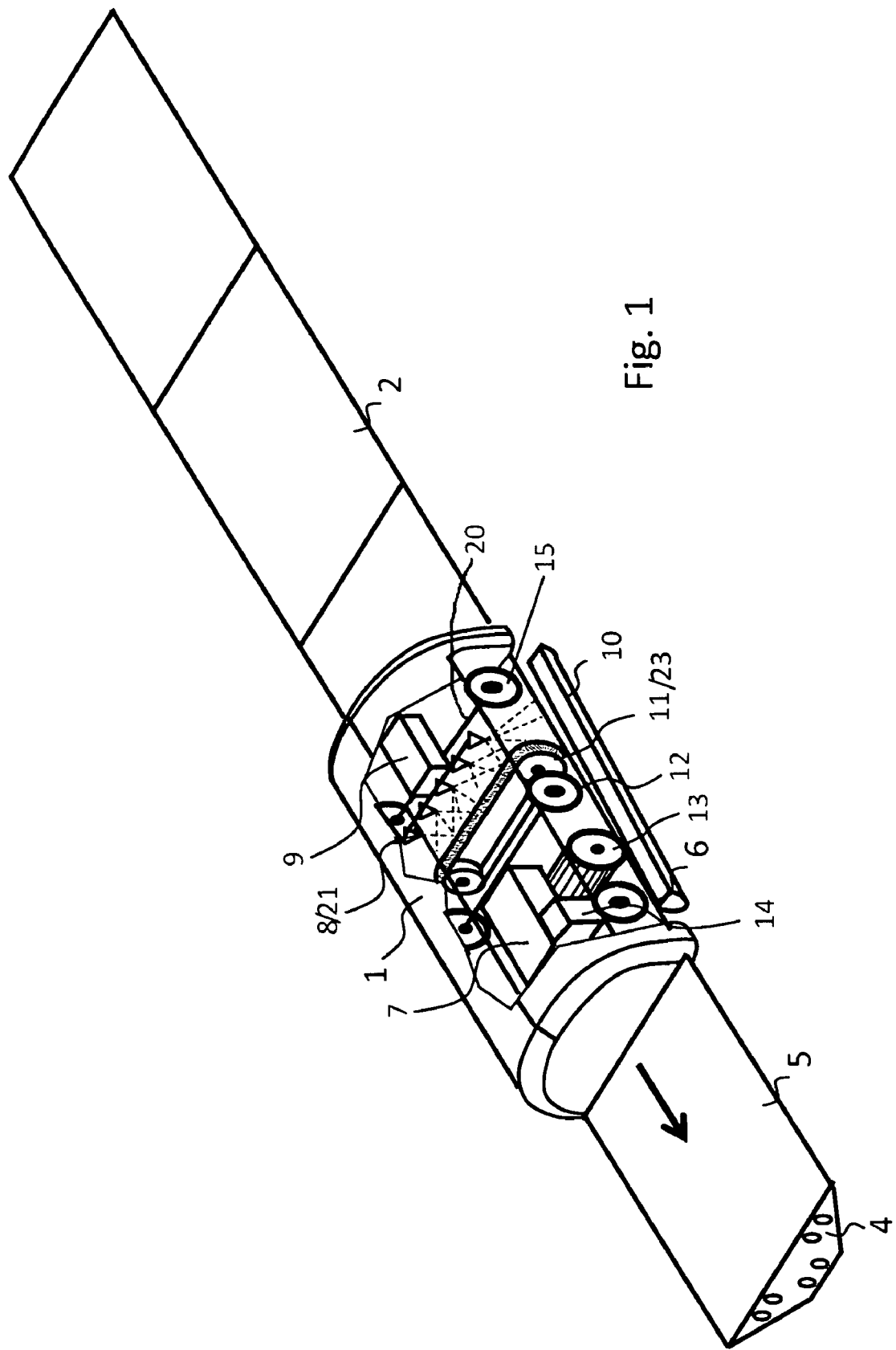

This application is the National Stage of PCT/DE2007/002071 filed on Nov. 15, 2007, which claims priority under 35 U.S.C. §119 of German Application No. 10 2006 053 704.1 filed on Nov. 15, 2006. The international application under PCT article 21(2) was not published in English.

The invention relates to a method and a device for cleaning solar panels, by means of a washing apparatus that can be moved on the solar panel, which applies washing water to the surface of the solar panel, using washing jets and/or brushes, and washes the surface.

Such a device is already previously known from the German Offenlegungsschrift DE 10 2004 036 094 A1 [examined patent published for public scrutiny]. The said invention relates to a washing apparatus that is disposed on a movable carriage, in the region of a side of a solar panel that is to be cleaned. The washing apparatus encompasses the entire channel-shaped solar panel, whereby washing jets disposed on the inner side of the washing apparatus spray washing water stored in a tank against the panel. In the run-off direction of the water, a capture channel disposed below a lower edge of the panel is assigned to the washing apparatus, in which the water that runs off over the solar panel is captured. The water captured in this manner can be collected, treated again, if necessary, and used again. Since the washing apparatus formed in this way can clean the solar panel only in a fixed position of the solar panel, because of its static arrangement, this arrangement is still subject to problems in this regard. While it is possible to use such an arrangement, according to the invention, at night, in other words when a power plant formed from the solar panels to be cleaned is out of operation, in order to clean the panels that have been brought into a cleaning position at that moment, cleaning would only be possible under the aforementioned conditions if contamination of the solar panels were to occur during the day, as well.

Against this background, the present invention is based on the task of creating a washing apparatus and a corresponding washing method for solar panels, in which cleaning is possible in simple manner and automatically, to a great extent, in a broad pivoting range of the solar panel.

This task is accomplished by means of a method for cleaning solar panels, in accordance with the characteristics of the main claim, and by a washing apparatus that can be moved on a solar panel, in accordance with the characteristics of the secondary claim 7. Other practical embodiments of the method according to the invention can be derived from the dependent claims, in each instance.

According to the invention, the washing apparatus, which is equipped, on its underside, with washing jets for applying washing water to the surface of the solar panel, and preferably with a brush assembly for cleaning same, can be set directly onto the solar panel, so that a guide rail in the area of the solar panel can be eliminated. Instead, the washing apparatus is adapted, in terms of its shape, to the solar panel, in the region of the longitudinal edges of the solar panel, in such a manner that the washing apparatus encompasses the solar panel in the edge region, and is guided to be longitudinally displaceable, using suitable slide means. Such an arrangement allows the washing apparatus to hold itself on the solar panel even when the latter is tilted, and thus setting the solar panel into a precisely defined cleaning position is not necessary. In this way, the situation is avoided that in the case of cleaning during operating hours of the solar panel, a displacement of the latter out of its operation must take place; this would cause a significant loss in efficiency.

Another advantage of this arrangement lies in the fact that a defined distance between cleaning means and surface is produced by means moving the washing apparatus directly on the surface to be cleaned. Thus, damage to the surface is avoided, and very efficient cleaning is made possible.

Furthermore, the present invention improves the arrangement proposed in the state of the art, to the effect that in addition to washing jets disposed on the underside of the washing apparatus, compressed air jets are also disposed, which can develop an additional effect during cleaning of the surface of the solar panel. In the present arrangement, this furthermore has the advantage that not only is the surface of the solar panel freed of dirt, but also, the water in which the dirt is dissolved can be completely removed from the surface of the solar panel. This has the advantage that even very contaminated water can still be used for cleaning the solar panel, as long as it is still capable of absorbing dirt particles. Thus, a clearly greater absorption capacity of the washing water for dirt that occurs, and clearly greater efficiency in this regard are achieved, according to the invention.

In this connection, it has particularly proven itself to equip the washing apparatus with a so-called known sword brush. This is an endless belt driven by an electric motor, which is essentially configured as an endless brush by means of a corresponding bristle placement.

Accordingly, it is practical that recovery of the washing water used can also take place, in accordance with the method according to the invention, in that a capture device is assigned to the washing apparatus on an edge of the solar panel on the run-off side, for example a capture channel, by way of which the washing water used can be passed back into a tank that is carried along on the washing apparatus. The water kept on hand in the used water tank can either be used for renewed cleaning of solar panels, or can be removed and passed to treatment. As an alternative to a capture channel into which the water is passed essentially under the effect of gravity, a suction device can be provided, particularly for cleaning horizontally adjusted solar panels, in place of the capture channel. The partial vacuum that is necessary for operation of the suction device can advantageously be produced using a compressor, which advantageously supplies the compressed air required for the compressed air jets, at the same time. In this case, it is practical to provide a water separator between suction device and intake side of the compressor, which separator brings about separation of water and compressed air that is produced.

It is advantageous if a drive, for example an electric motor, is assigned to the washing apparatus, by means of which the washing apparatus can be moved on the solar panel. It is furthermore advantageous if the washing apparatus can be used automatically, so that independent movement on the solar panels is made possible on the basis of the guide formed by the longitudinal edges of the solar panels as well as the electric motor. It is possible to thread the washing apparatus on or off at solar panels positioned at the ends.

To improve the washing result, the angle position of the washing jets and/or the compressed air jets is selected in such a manner that the jets are oriented in the direction of the water run-off to be expected. In this way, removal of the water from the surface to be cleaned is additionally promoted. In a practical further development, the washing jets and/or compressed air jets can be adjusted in their angle position, in such a manner that each angle position of the solar panel to be cleaned can be taken into consideration. It is advantageous if the angle setting takes place automatically.

Guidance of the washing apparatus on the solar panel advantageously takes place by means of a plurality of wheel axles and/or roller axles, which are distributed over the lower surface of the washing apparatus, spaced apart from one another. The said wheel axles and/or roller axles are advantageously particularly spaced so far apart from one another that a space between two adjacent solar panels can be overcome in that a plurality of wheel axles and/or roller axles still engage on one solar panel, while the foremost wheels or rollers already reach the adjacent solar panel. Solar panels adjacent to one another are usually oriented towards the same receiver, so that they usually also have the same angle orientation. A different angle orientation of two adjacent solar panels, which would make such a transfer impossible, therefore does not have to be feared.

Because of different possible angle positions of the solar panels, it is practical to also produce a lateral guide of the washing apparatus in that lateral guide rollers are also provided in the washing apparatus, in the region of the edges of the solar panel. These lateral guide rollers have running surfaces that run essentially at a right angle to the surface to be cleaned, and thus ensure additional guidance of the washing apparatus on the solar panel.

In a concrete embodiment, however, the washing apparatus can also be operated as a non-autarchic system, in that an external washing vehicle is assigned to a washing apparatus. This vehicle travels between the solar panels, while a connection by means of cable winches between washing vehicle and washing apparatus is implemented by way of boom arms of the washing apparatus or washing apparatuses assigned to the washing vehicle. The washing apparatuses can be pivoted out, by way of the boom arms, using the cable winches, and threaded onto the solar panels, and afterwards, the washing vehicle follows the washing apparatuses along the solar panels. In this case, supply to and disposal from the washing apparatuses takes place from the washing vehicle, whereby the washing vehicle can optionally store and supply energy and/or washing water.

The invention described above will be explained in greater detail in the following, using an exemplary embodiment shown in the drawing.

Figure 2:
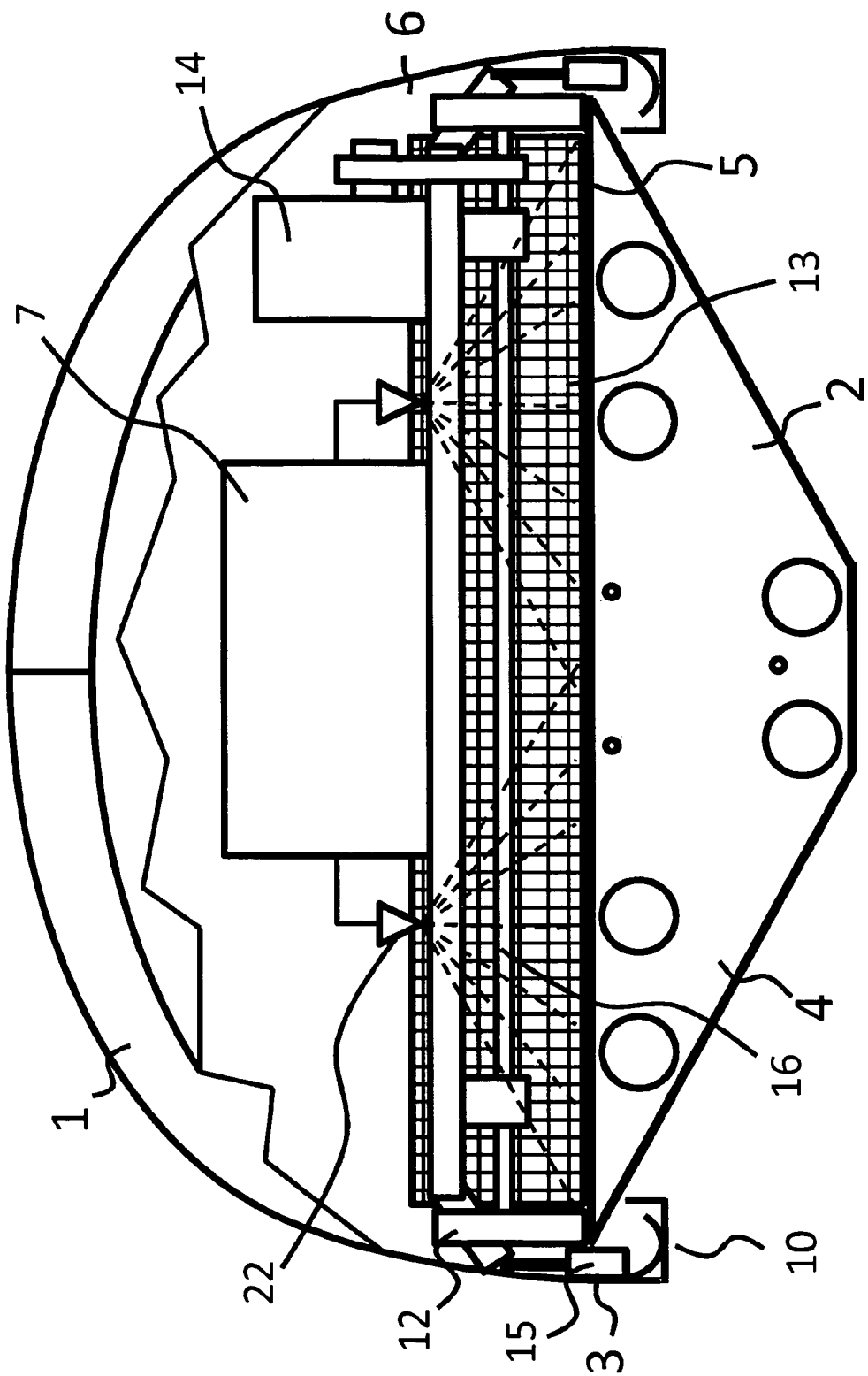
Figure 3:
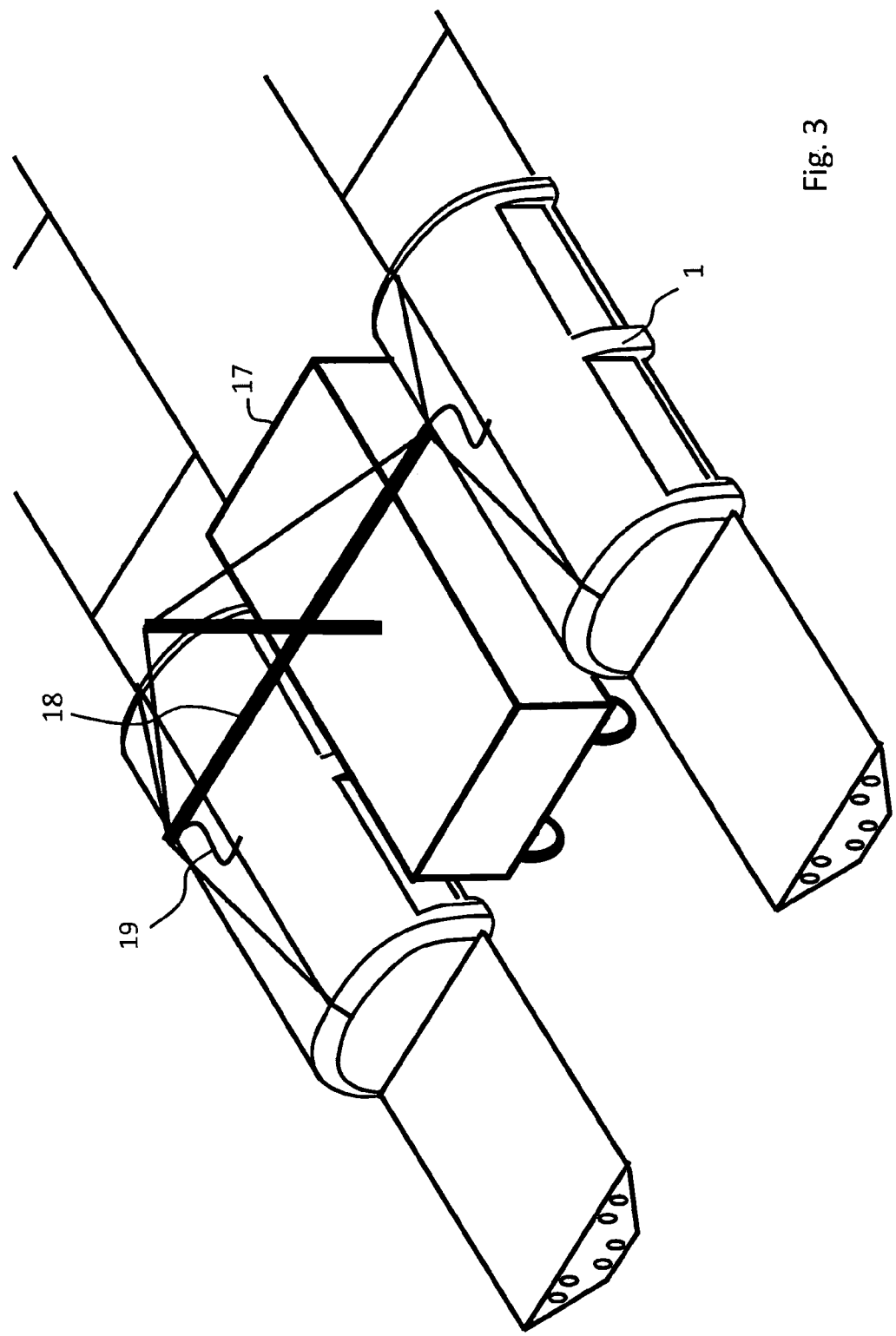

This shows:

FIG. 1 a washing apparatus that is set onto a solar panel, in an isometric representation, with a cut-away view of inner components of the washing apparatus, FIG. 2 the washing apparatus according to FIG. 1 in a top view, from the side, through a cross-section of the washing apparatus, and FIG. 3 a washing system that includes multiple washing apparatuses of the kind shown in FIGS. 1 and 2, the washing system being shown in an isometric representation.

FIG. 1 shows a washing apparatus 1 for cleaning solar panels 2, which is set onto a solar panel 2. In this connection, cleaning of the solar panel 2 can take place at different angle positions of the support structure 4, since the washing apparatus 1 encompasses the edges of the solar panel 2 in clamping manner. In this connection, the washing apparatus 1 is mounted on rollers such as lateral guiding rollers 15 that allow movability of the washing apparatus 1 in the longitudinal direction of the solar panel 2. Thus, it is not necessary to assign a guide rail or similar guide device for the washing apparatus 1 to the solar panel 2. The washing apparatus 1 can be used both on heliostats for line-focused solar-thermal power plants, and for parabolic channels or photovoltaic systems. In each case, the side of the washing apparatus 1 that faces the solar panel 2 is adapted, at least to a great extent, to the surface or mirror surface 5 of the solar panel 2. During the course of cleaning, the washing apparatus 1 slides over the solar panel 2, whereby washing water is applied to the mirror surface 5 of the solar panel 2 from a water tank that is carried along with the washing apparatus 1, by way of corresponding washing jets, i.e. water jets 22, and, if necessary, additional cleaning of the solar panel 2 is brought about by means of brush assemblies such as brush assembly 13. Cleaning of the solar panel 2 brought about in this manner is additionally supported using compressed air jets 8 such as the air jets 8 that are shown at a back of the washing apparatus 1, which also loosen dirt particles from the mirror surface 5, for one thing, and for another in turn free the mirror surface of washing water. The washing water can be pumped back into a water tank accommodated within the housing 6 of the washing apparatus 1, using a suction device 21, so that the cleaned mirror surface 5 is left dry, to a great extent. In this way, cleaning with relatively contaminated water is possible, since removal of water and dirt, essentially free of residues, is guaranteed by the cleaning with compressed air and the drying of the solar panel 2.

FIG. 2 shows the washing apparatus 1 described above in a side view, whereby the encompassing of the solar panel 2 by the washing apparatus 1 particularly stands in the foreground. In the region of the side edges of the solar panel 2, an accommodation 3 for the side edges of the solar panel 2 is provided in the washing apparatus 1, on both sides, in each instance, which accommodates the edges, and in the region of which mounting of the washing apparatus 1 on the solar panel 2 is brought about using rollers including wheels 12 and lateral guiding rollers 15 having different orientation. By means of the additional guide rollers 15, which are disposed essentially perpendicular to the mirror surface 5 with their running surface, centering of the washing apparatus 1 on the solar panel 2 is brought about, and guidance of the washing apparatus 1 is made complete. A motor drive 14 is assigned to the washing apparatus 1, so that automatic cleaning of a solar panel 2 can take place. Cleaning of multiple solar panels 2 can take place in that the washing apparatus 1 pushes itself beyond the end of a solar panel 2, whereby the dimensions of the washing apparatus 1, particularly the axle spacings, are selected in such a manner that there is still a hold on the first solar panel when the second solar panel is reached. In this manner, spaces between the solar panels 2 can be bridged, and automatic cleaning of a plurality of solar panels 2 with the arrangement according to the invention is made possible.

A water separator 7 of the washing apparatus 1 is also shown in FIGS. 1 and 2. A compressor 9 of the washing apparatus 1 is shown in FIG. 1. A capture device 10 accommodates used washing water, is disposed in at least the edge region of the solar panel 2 when the washing apparatus 1 encompasses the solar panel 2, and is situated in a run-off direction of the washing water.

As shown in FIG. 1, a sword brush 11 includes an endless belt system 23. The endless belt system 23 has an outside and is equipped with projecting bristles on the outside.

FIG. 1 shows a roller 15 having a roller axle 20. An axle 16 of the wheels 12 is shown in FIG. 2.

FIG. 3 shows a washing system including multiple washing apparatuses 1 of the kind shown in FIGS. 1 and 2. The washing system shown in FIG. 3 also includes a washing vehicle 17, boom arms 19 attached to the washing vehicle 17, and supply and disposal lines 18 of the washing apparatuses 1. These supply and disposal lines 18 connect the washing apparatuses 1 with the washing vehicle 17.

Above, a washing apparatus and a washing method for solar panels are therefore described, in which a holding system is implemented, so that setting the washing apparatus directly onto the solar panels to be cleaned, even without guide rails, is made possible. Furthermore, known washing methods for solar panels are improved to the effect that more efficient cleaning that saves water and resources is implemented, using compressed air.

REFERENCE SYMBOL LIST 1 washing apparatus
2 solar panel
3 accommodation
4 support structure
5 mirror surface
6 housing

The invention claimed is:

1. A washing apparatus that can be moved on a solar panel, for cleaning the solar panel, the washing apparatus having washing jets for application of washing water to a sun-facing surface of the solar panel, the washing lets being on a side of the washing apparatus able to face the sun-facing surface of the solar panel,
  wherein the washing apparatus can encompass the solar panel in an edge region of the solar panel in such a manner that the washing apparatus can be guided, in longitudinally displaceable manner, directly on the solar panel,
  wherein the washing apparatus further comprises a suction device comprising at least one suction nozzle,
  wherein used washing water can be removed from the sun-facing surface of the solar panel using the suction device,
  wherein the washing apparatus further comprises a compressor,
  wherein a partial vacuum required for operation of the suction device is produced using the compressor, and
  wherein the compressor can be used to generate compressed air to supply compressed air jets.

2. The washing apparatus according to claim 1, wherein the washing apparatus further comprises rollers and/or wheels in an edge region of the washing apparatus.

3. The washing apparatus according to claim 1, wherein the washing apparatus further comprises a motor drive, and
  wherein the motor drive empowers the washing apparatus for automatic movement along the solar panel.

4. The washing apparatus according to claim 1, further comprising air jets on a side of the washing apparatus able to face the sun-facing surface of the solar panel.

5. The washing apparatus according to claim 4, further comprising at least one brush assembly,
  wherein water applied to the sun-facing surface of the solar panel by the washing apparatus can be removed from the sun-facing surface using compressed air from the air jets, and using the at least one brush assembly.

6. The washing apparatus according to claim 4, wherein the washing jets and/or the air jets are disposed such that the washing jets and/or the air jets can be set at a slant relative to the sun-facing surface of the solar panel in such a manner that water and/or compressed air applied by the washing jets and/or the air jets, respectively, is or are oriented in a run-off direction of the water.

7. The washing apparatus according to claim 6, wherein an angle position of the washing jets and/or the air jets can be adjusted.

8. The washing apparatus according to claim 4, wherein at least a part of the air jets is disposed at a back of the washing apparatus.

9. The washing apparatus according to claim 1, further comprising at least one brush assembly comprising a sword brush comprising an endless belt, the endless belt having an outside and being equipped with projecting bristles on the outside,
  wherein the washing apparatus further comprises:
    a deflection roller disposed at a remote location in the washing apparatus,
    an electric motor, and
    a drive roller able to be driven by the electric motor, and
  wherein the endless belt is guided over the deflection roller and can be put into circulation by the drive roller as the drive roller is driven by the electric motor.

10. The washing apparatus according to claim 1, further comprising at least one brush assembly articulated on the washing apparatus so that the at least one brush assembly can pivot.

11. The washing apparatus according to claim 1, further comprising a capture device:
    for accommodating used washing water,
    disposed in least the edge region of the solar panel when the washing apparatus encompasses the solar panel, and
    situated in a run-off direction of the washing water.

12. The washing apparatus according to claim 1, further comprising a water separator.

13. The washing apparatus according to claim 1, further comprising multiple wheel axles and/or roller axles.

14. The washing apparatus according to claim 1, further comprising supply and disposal lines able to connect the washing apparatus to an external washing vehicle.

15. A washing system comprising multiple washing apparatuses, a washing vehicle, and boom arms attached to the washing vehicle
  wherein each washing apparatus can be arranged on a respective solar panel to be moveable on the respective solar panel for cleaning the respective solar panel,
  wherein each washing apparatus has washing jets for application of washing water to a sun-facing surface of the respective solar panel on a side of the washing apparatus facing the sun-facing surface of the respective solar panel,
  wherein each washing apparatus can encompass the respective solar panel in an edge region of the respective solar panel in such a manner that the washing apparatus can be guided, in longitudinally displaceable manner, directly on the respective solar panel,
  wherein each washing apparatus comprises supply and disposal lines connected to the washing vehicle, and
  wherein the multiple washing apparatuses are suspended on the boom arms so that the multiple washing apparatuses can be pivoted and adjusted in height using cable winches.

16. A washing apparatus that can be moved on a solar panel, for cleaning the solar panel, the washing apparatus having washing jets for application of washing water to a sun-facing surface of the solar panel, the washing jets being on a side of the washing apparatus able to face the sun-facing surface of the solar panel,
  wherein the washing apparatus can encompass the solar panel in an edge region of the solar panel in such a manner that the washing apparatus can be guided, in longitudinally displaceable manner, directly on the solar panel, wherein the washing apparatus further comprises guide rollers disposed on sides of the washing apparatus,
wherein the guide rollers are located in the edge region of the solar panel when the washing apparatus encompasses the solar panel, and
wherein running surfaces of the guide rollers lie against edges of the solar panel when the washing apparatus encompasses the solar panel.

* * * * *